United States Patent [19]
Davis

[11] Patent Number: 5,524,863
[45] Date of Patent: Jun. 11, 1996

[54] QUARTER TURN ROTATABLE FLOW CONTROL VALVE

[75] Inventor: Ronald W. Davis, Tomball, Tex.

[73] Assignee: Daniel Industries, Inc., Houston, Tex.

[21] Appl. No.: 257,104

[22] Filed: Jun. 8, 1994

[51] Int. Cl.⁶ .................................. F16K 5/06; F16K 5/10
[52] U.S. Cl. ........................ 251/127; 137/625.32; 251/209
[58] Field of Search ........................ 137/625.32; 251/127, 251/209

[56] References Cited

U.S. PATENT DOCUMENTS

| | | | |
|---|---|---|---|
| 2,510,514 | 6/1950 | Mueller | 251/209 |
| 3,347,517 | 10/1967 | Scaramucci. | |
| 3,403,887 | 10/1968 | Myers | 251/209 |
| 3,542,337 | 11/1970 | Scaramucci. | |
| 3,542,338 | 11/1970 | Scaramucci. | |
| 3,773,291 | 11/1973 | Grauer | 251/209 X |
| 3,786,837 | 1/1974 | Pipkins. | |
| 3,880,191 | 4/1975 | Baumann. | |
| 3,883,113 | 5/1975 | Kolb. | |
| 3,985,150 | 10/1976 | Kindersley. | |
| 4,164,343 | 8/1979 | Graebner. | |
| 4,212,321 | 7/1980 | Hulsey | 251/209 X |
| 4,364,409 | 12/1982 | Jones | 251/209 |
| 4,364,415 | 12/1982 | Polon. | |
| 4,401,238 | 8/1983 | Marchadour. | |
| 4,530,375 | 7/1985 | Bey | 251/127 |
| 4,540,025 | 9/1985 | Ledeen et al.. | |
| 4,610,273 | 9/1986 | Bey | 251/127 |
| 4,665,946 | 5/1987 | Hulsey | 251/209 |
| 4,881,718 | 11/1989 | Champagne | 251/209 |
| 4,889,163 | 12/1989 | Engelbertsson. | |
| 5,070,909 | 12/1991 | Davenport. | |
| 5,287,889 | 2/1994 | Leinen. | |

FOREIGN PATENT DOCUMENTS 340681  8/1959  Switzerland ........................ 251/209

*Primary Examiner*—Robert G. Nilson
*Attorney, Agent, or Firm*—Bush, Moseley, Riddle & Jackson

[57] ABSTRACT

A rotatable flow control valve mechanism is provided having a valve body having a valve chamber and straight through flow passages intersecting the valve chamber. A rotatable valve element, which may be of straight, spherical or tapered configuration, is positioned for rotation within the valve chamber and is sealed with respect to the valve body by sealing elements that surround the flow passages. The rotary valve element defines a straight through flowway that is aligned with the flow passages of the valve body in the fully open condition of the valve and permits unobstructed flow through the valve and, when the flowway has a dimension at least as great as the dimension of the flow passage, permits objects such as pigs and scrapers to pass through the valve. For flow controlling activity the rotary valve element defines flow controlling passages in the form of holes or contoured slots which intersect the flowway and the outer peripheral surface thereof and incorporates anti-cavitation and noise abatement trim. The ratio of flow control slot length to flowway diameter is in the range of from 2.0 to 1.0 to 4.0 to 1.0 and is determinative of valve diameter. The noise abatement and anti-cavitation trim may be located at least partially within the flowway as well. The rotary valve element is of sufficient diameter relative to the diameter of the flowway that rotational movement between the fully open and fully closed positions is achieved in about 90°. The flow control valve may also be of the top entry variety, thus permitting it to be repairable while installed in a flow line.

5 Claims, 8 Drawing Sheets

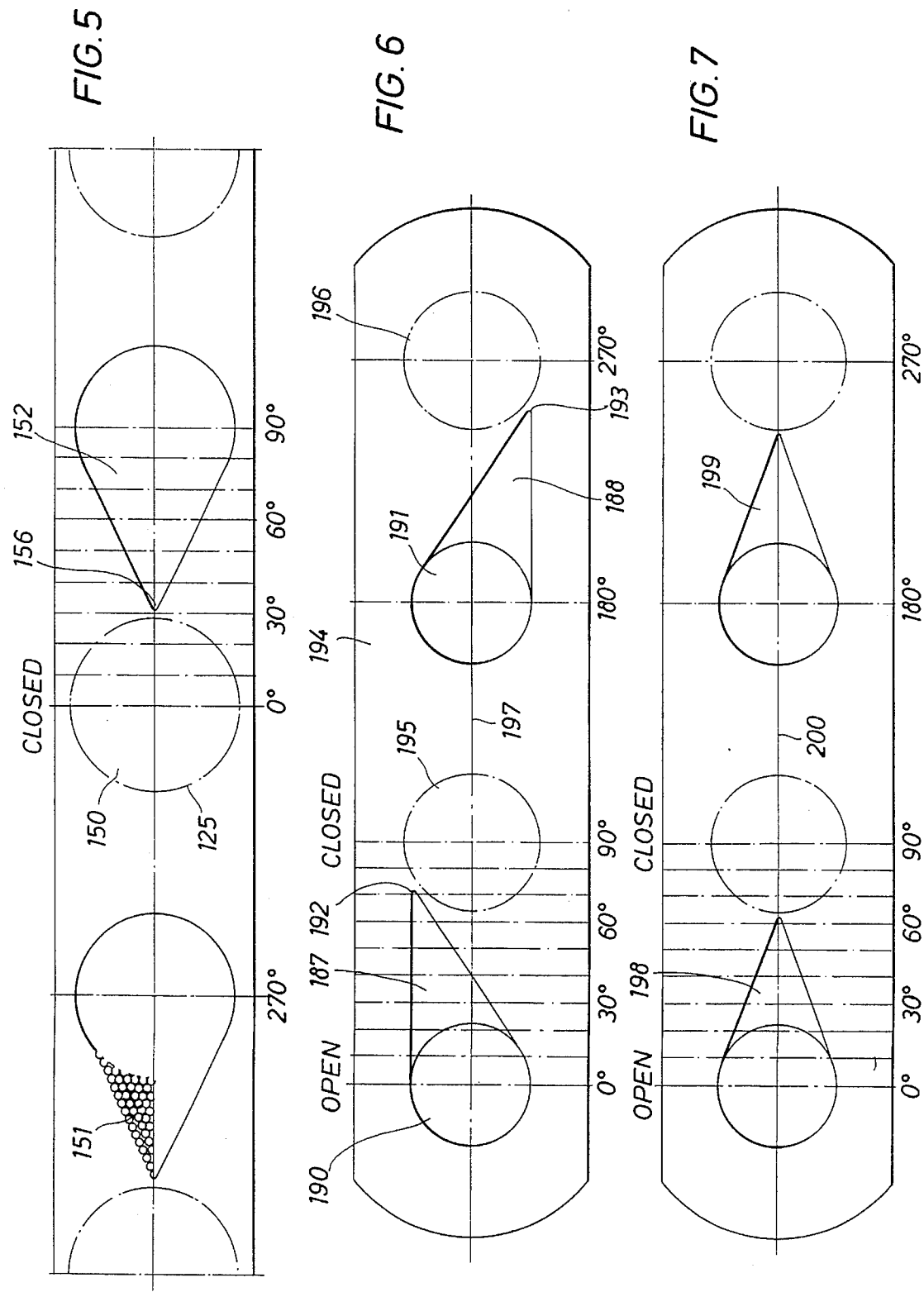

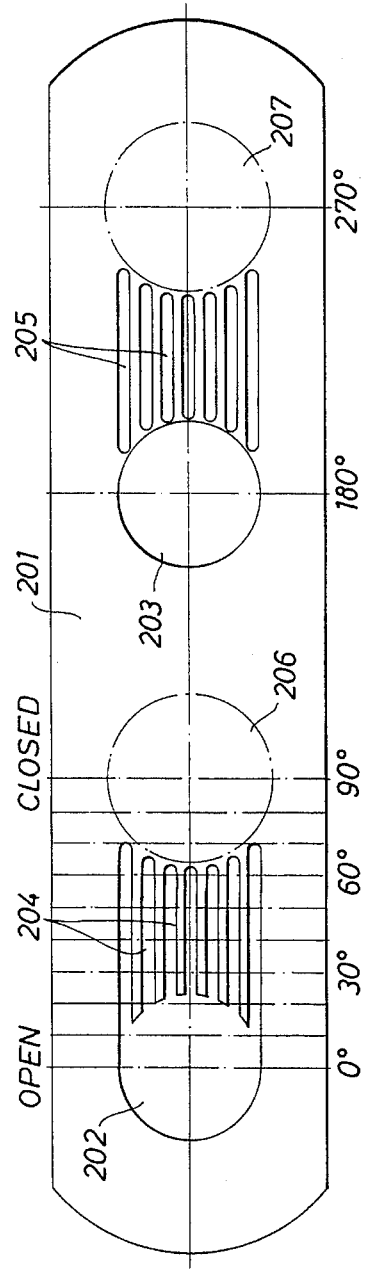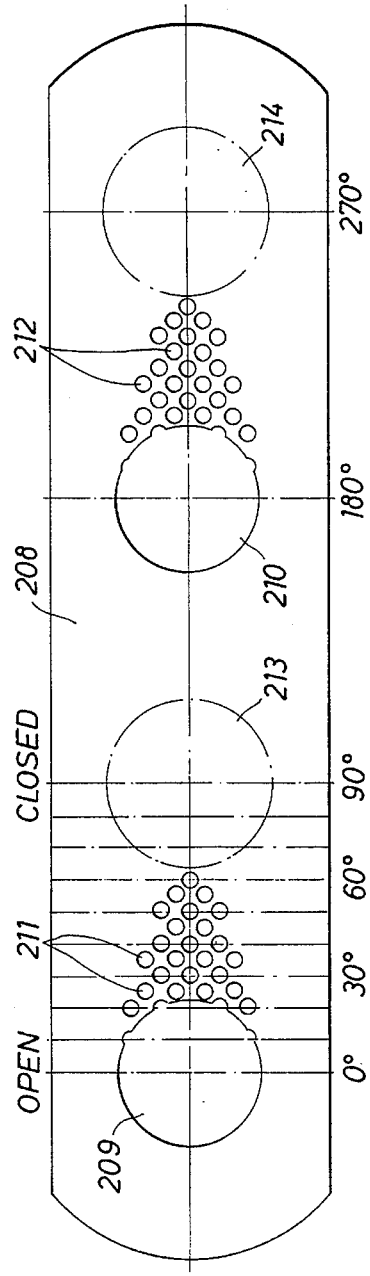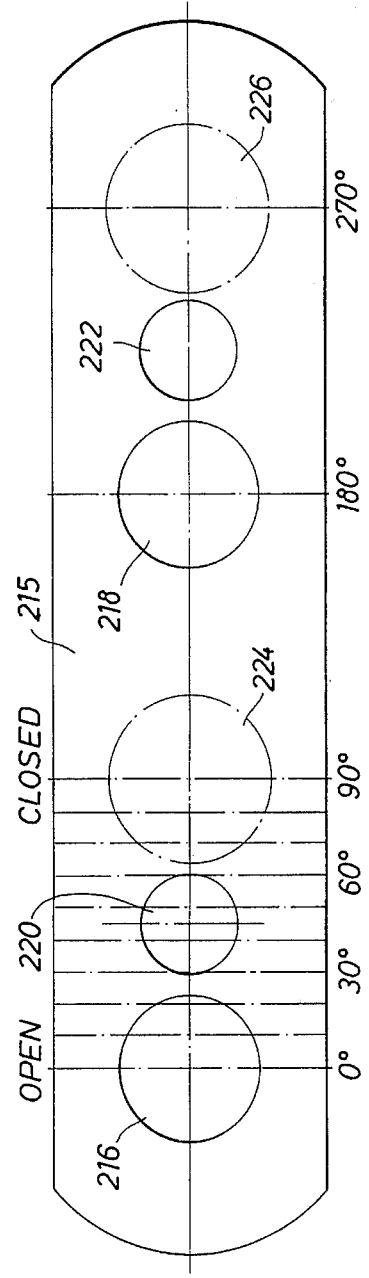

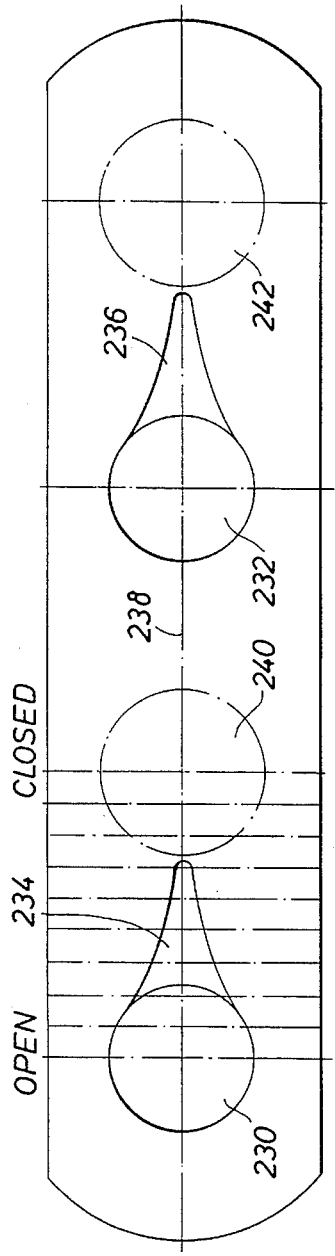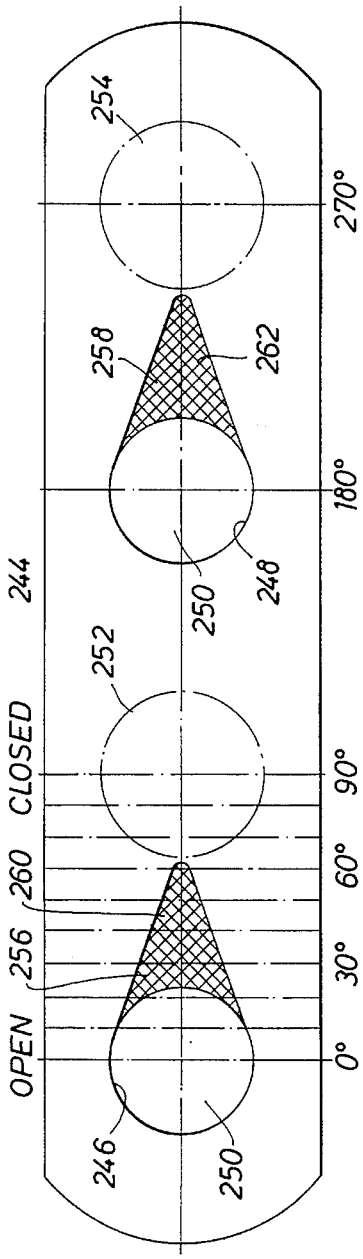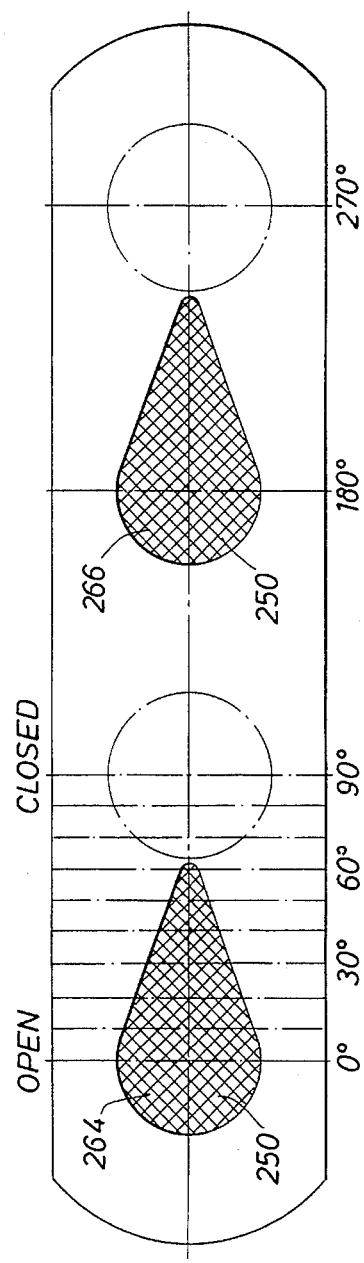

QUARTER TURN ROTATABLE FLOW CONTROL VALVE

FIELD OF THE INVENTION

This invention relates generally to flow control valves such as are typically utilized for controlling the flow of fluid within a flow passage such as a flow line and more specifically concerns a rotatable plug type flow control or throttling valve mechanism which is movable between fully open and fully closed positions thereof within a rotational movement of about 90° and which provides for minimal pressure drop across the valve when in the full open position and provides wide rangeability of flow control between the full open and tapered closed positions thereof. This invention also concerns rotary flow control valves having wide "rangeability", i.e. the ratio of maximum controlled flow to minimum controlled flow as set forth in ISA S75.05 (Instrument Society of America Standard defining control valve terminology).

BACKGROUND OF THE INVENTION

Various types of valve mechanisms such as globe valves, gate valves and rotary plate valves have been widely used for fluid flow control, also referred to herein as "throttling". Various types of rotary valves such as spherical plug or ball valves, straight rotary plug valves and tapered plug valves have also been frequently designed for fluid flow control activity. These types of rotary valves are not generally favored for flow control because they are frequently subject to severe vibration and noise during operation and they are also subject to a condition known as "windmilling" wherein the rotary valve element is subject to flow induced rotational forces which can oppose opening or closing actuator forces. This disclosure is particularly limited to rotatable plug type flow control valves because they are of rather compact design and because through the addition of noise abatement and anti-cavitation tim these valves can be quite effective from the standpoint of efficiently controlling the flow of high pressure fluids.

In many service conditions a principal problem with fluid flow control activity is the existence of significant pressure drop across the valve even when the valve is open to its maximum extent. This condition of significant pressure drop typically occurs because of partial obstruction of the flowway of the valve with flow controlling mechanisms or because of the unusual configuration of the flowway itself which is necessary to accomplish flow control activity. It is desirable to provide a throttling valve mechanism having a pressure drop in the full open position which is substantially that of a conventional full opening valve. To achieve minimal pressure drop across the valve a rotary spherical plug valve or ball valve is at times used because the ball can be positioned in a partially closed condition for flow control and in the full open position, offers minimal resistance to flow. The turbulence that is developed within the valve chamber and flowway of a ball vane in the partially closed flow controlling position thereof, especially under high pressure conditions, can cause severe vibration, can be exceptionally noisy and can induce severe cavitation. This disadvantage can be overcome by the addition of noise abatement and anti-cavitation trim which defines torturous paths through which the fluid flows. Further, forces tending to rotate the ball of a conventional ball valve past a critical position, especially when the critical position is more toward the closed position of the valve, can become reversed and can cause windmilling of the rotary valve element which at times opposes the actuator force and at times adds to the actuator force or requires the actuator to apply a braking force to retard the flow induced rotational force. A valve actuator for these types of flow control valves must therefore be capable of inducing a force for valve opening and be capable of retarding the valve closing force after the valve ball has been rotated past the critical position. Because of these disadvantages the use of conventional ball valves for purposes of throttling activity is not generally favored. It has been determined however that the addition of means defining a torturous path through the flow controlling passages of the valve and the development of a pressure drop as the fluid flows through the valve minimizes noise, vibration and cavitation and permits the advantages of these valves to be used.

Many high pressure rotatable flow control valves such as ball valves have been employed which incorporate valve body flow passages and valve ball flowways of differing dimension so as to permit the development of a pressure differential across the valve plug or ball particularly for the purpose of anti-cavitation and noise minimization. When valves of this type are utilized for flow controlling purposes high velocity flow of fluid through a restricted orifice can induce significant turbulence that causes the valve to vibrate while in service. At times depending on flow conditions this vibration can be quite violent. Additionally this extremely high pressure flow of fluid through a restricted orifice can develop significant noise that renders these types of valves quite unsatisfactory. It is well known that cavitation activity within a control valve is a cause of rapid deterioration of internal valve components and internal valve surfaces. It is desirable in almost all cases to place significant design emphasis on valve systems for minimizing cavitation during valve operation. Various types of anti-cavitation and noise abatement mechanisms, typically referred to as "trim" have been developed for utilization in flow control valves to establish torturous paths for controlled fluid flow and develop a designed pressure drop as the fluid flows through the valve to thus minimize the detrimental effects of fluid cavitation and high velocity fluid noise as well as valve vibration.

In the pipeline industry the inside walls of the pipe through which the fluid flows can become contaminated by line scale, sand and other such debris. Additionally, deposits of material from the flowing fluid can adhere to inside; surfaces of the flow line and any valves that are employed to control the flow of the fluid. For this reason various mechanical cleaning devices such as pigs, balls, scrapers and the like are passed through a flow line under the influence of the flowing fluid to accomplish periodic line cleaning. In some cases it may be desirable to provide for mechanical cleaning of flow lines that are controlled by throttling valves. For the reason that few flow control valves define straight through passages and the flow passages of many flow control valves are at least partially obstructed by noise abatement and anti-cavitation trim, the use of line cleaning devices in throttled flow lines is not ordinarily a consideration. It is desirable therefore to provide a flow control valve mechanism that can permit such line cleaning devices be capable of being used. It is also desirable to provide a rotatable flow control valve mechanism having the capability of achieving a straight through flow passage at all positions thereof from virtually closed to full open so as to permit unobstructed flow of fluid in the fully open condition of the valve to provide for minimal pressure drop and to provide for maximum flow at any given pressure condition.

Most flow control valves are designed so that any normal wear or erosion that is induced during use will occur on replaceable valve parts. Thus, when repair is necessary the valve mechanism can be quickly disassembled and the replaceable worn components can be removed and replaced. Especially in the case of large flow control valves for pipelines and the like it is desirable to provide the capability for repair of these valves in place. This feature permits the repair operation to be expedited so that the down time of the flow line can be minimized and the cost of repair can also be minimized. It is also desirable therefore to provide a rotatable plug type flow control valve mechanism having the capability of being repaired while remaining in the line. This is typically accomplished by providing a top entry type plug valve or providing a plug valve capsule that is removable from a location between connecting flanges of the flow line.

As mentioned above, few flow control valves are provided with good rangeability of flow control, i.e., the ability for the control of flow to be varied over a wide range responsive to selected positions of the rotary flow control element. Thus, when flow conditions of a flow line change, it is often necessary to replace the flow controlling trim to accommodate the changed conditions. It is desirable to provide a rotary flow control valve having wide rangeability so that it is seldom necessary to shut down the flow line for trim package replacement. At times the flow controlling trim of control valves can become partially blocked with accumulated debris such that desired flow control cannot be accomplished. If the valve mechanism has a wide range of flow control, i.e., good rangeability, this problem can often be accommodated by simply adjusting the flow control position of the valve element.

Rotatable plug valves have been developed for flow control service having straight, tapered or spherical valve plug elements that permit flow control across a wide range of flow conditions and also provide the valve with full opening capability. U.S. Pat. No. 4,212,321 of Hulsey is an example of a spherical plug type full control valve of this nature. Though capable of providing exceptional flow control and having excellent rangeability, the valve of the Hulsey patent requires an axis of valve rotation that is inclined with respect to the longitudinal axis of the flowway, which prevents its effective use for valves that are intended for inline repairability. Additionally, rotational movement of the valve ball between fully open and fully closed positions typically requires valve ball rotation significantly exceeding 90°. Thus, valve operators for opening closing and selective positioning of the valve ball are typically of special design and add further to the expense of the valve mechanism. It is desirable to provide a rotary flow control valve having a rotary valve element provided with a flowing therethrough and flow control slots which are open to the flowway and intersect the annular surface of the valve element. The flow control slots are of contoured configuration and defined by a ratio of flowway diameter to ball diameter to be in the range of from 2.0 to 1 to 4.0 to 1. This ratio defines the maximum length of the flow control slot. The 2.0 to 1 ratio would have a shorter flow control slot than a 4.0 to 1. A ratio range of from 2.3 to 3.2 would be considered optimum in comparison with the diameter of the valve element which establishes complete shutoff and full opening in rotary valve movement of about 90°. These features permit the rotatable flow control valve mechanism to have the capability of achieving movement between its fully open and fully closed positions in valve plug rotation of about 90° while at the same time minimizing the overall dimension of the valve element and thus the overall dimension of the valve mechanism. It is also desirable to provide a rotatable plug type flow control valve having a valve stem that is oriented in normal relation to the axis of the flow passage defined by the valve body to thus minimize the complexity of the valve mechanism, to provide for controlled movement by standard valve actuators, and to permit it to be manufactured in a top entry, in line repairable, design if desired.

When flow control valves of a general nature are provided for controlling the flow of high pressure fluid it is typical for the anti-cavitation and noise minimization trim to be different at the inlet and outlet ports of the valve so that the valve becomes basically unidirectional. It is desirable from the standpoint of the present invention to provide a spherical rotational flow control valve having a quarter turn valve plug with anti-cavitation and noise abatement trim within the throttling passages of the valve plug and wherein the flow controlling trim at the inlet and outlet flow control passages may be substantially the same or different as desired.

SUMMARY OF THE INVENTION

It is a feature of the present invention to provide a novel rotatable flow control valve that is capable of moving between fully open and fully closed positions by rotational valve plug movement in the range of 90°.

It is also a feature of this invention to provide a novel quarter turn rotatable flow control valve having a rotatable plug with cavitation passages and wherein the cavitation passages may have identical or differing upstream and downstream trim for purposes of anti-cavitation and noise minimization so that the valve may be bi-directional or unidirectional if desired.

It is even a further feature of this invention to provide a novel rotatable flow control valve having a circumferential plug dimension relative to flowway dimension which ensures full opening and full closing upon plug rotation of approximately 90°. It is even a further feature of this invention to provide a novel rotatable plug type throttling valve that defines a straight through passage when fully open so as to permit unobstructed flow of fluid therethrough and to permit passage of mechanical line cleaning devices therethrough when the straight through flow passage is of sufficient dimension to permit the passage of such objects therethrough.

It is also a feature of this invention to provide a novel rotatable flow control valve having a valve stem which is oriented at substantially 90° relative to the flowway through the valve plug element to thus promote simplicity and cost efficiency of the valve design.

It is even a further feature of this invention to provide a novel quarter turn rotatable flow control valve having a rotary valve element with contoured flow control passages or tapered "V" slots therein and with anti-cavitation and noise minimization trim within the flow control passages or slots which may be reversed relative to fluid flow so as to permit fluid flushing of accumulated solids from the trim..

It is another feature of this invention to provide a novel rotatable plug type flow control valve which may be of selective design to provide for unidirectional or bi-directional operation.

Briefly, the various features of the present invention are achieved through the provision of a flow control valve mechanism having a valve body structure defining an internal valve chamber and defining flow passages in communication with the valve chamber. A rotary valve element in the form of a straight, spherical or tapered rotatable plug is located within the valve chamber and is sealed with respect to the valve body by means of valve seat elements oriented about the flow passages. The rotatable valve element is rotatable between fully open and fully closed positions by valve rotation in the range of from about 60° to about 130° and preferably valve element rotation of about 90°. The rotatable valve element defines an internal flowway which in the fully open position is positionable in aligned registry with the flow passages of the valve body to provide for straight through unobstructed flow of fluid to establish a minimal pressure drop across the valve and, where line cleaning may be desired, to provide for passage of objects such as line cleaning devices through the valve mechanism. At least one and preferably a pair of opposed flow control slots or passages are defined externally or internally of the rotary vane element and extend from respective ends of the flowway along an outer circumferential portion of the valve element. These flow control passages are typically of contoured "V" shaped cross-sectional configuration which vary in both width and depth along the length thereof. The slots define bottom lines that are so extensive so that a straight through path is denied through the valve element on any position thereof. If desired however, the flow control passages may take the form of multiple channels or passages in the rotatable valve element which define flow control passages of controlled dimension. The valve element has a valve stem and trunnion that are axially aligned and which define an axis of rotation about which the valve element is rotatable. The axis of the valve stem and trunnion is disposed in normal relation with the longitudinal axis of the flow passages of the valve body. This feature permits simplicity of valve design and also permits the valve mechanism to take the form of a top entry type if desired so that it may be repaired in the line if necessary.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 1:
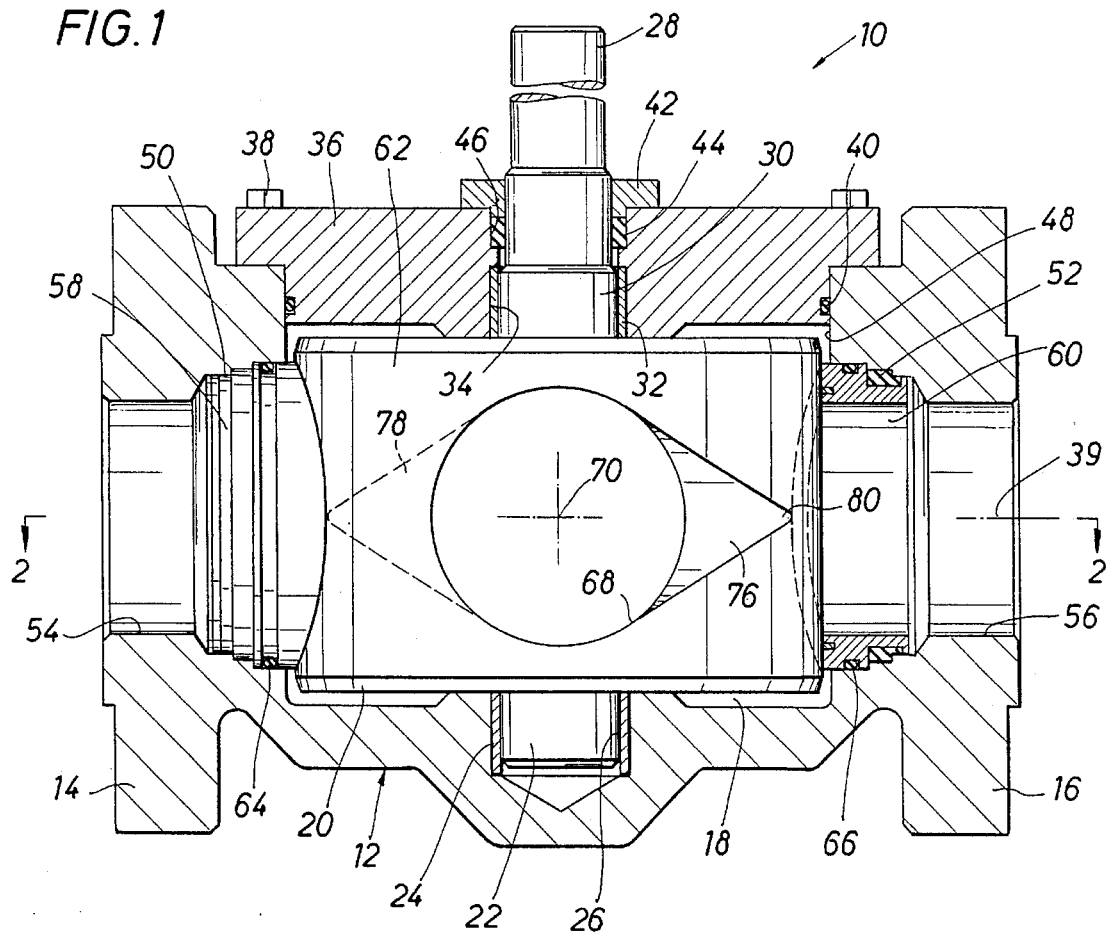

FIG. 1 is a sectional view of a top entry spherical plug type rotary full control valve that is constructed in accordance with the present invention.

Figure 2:
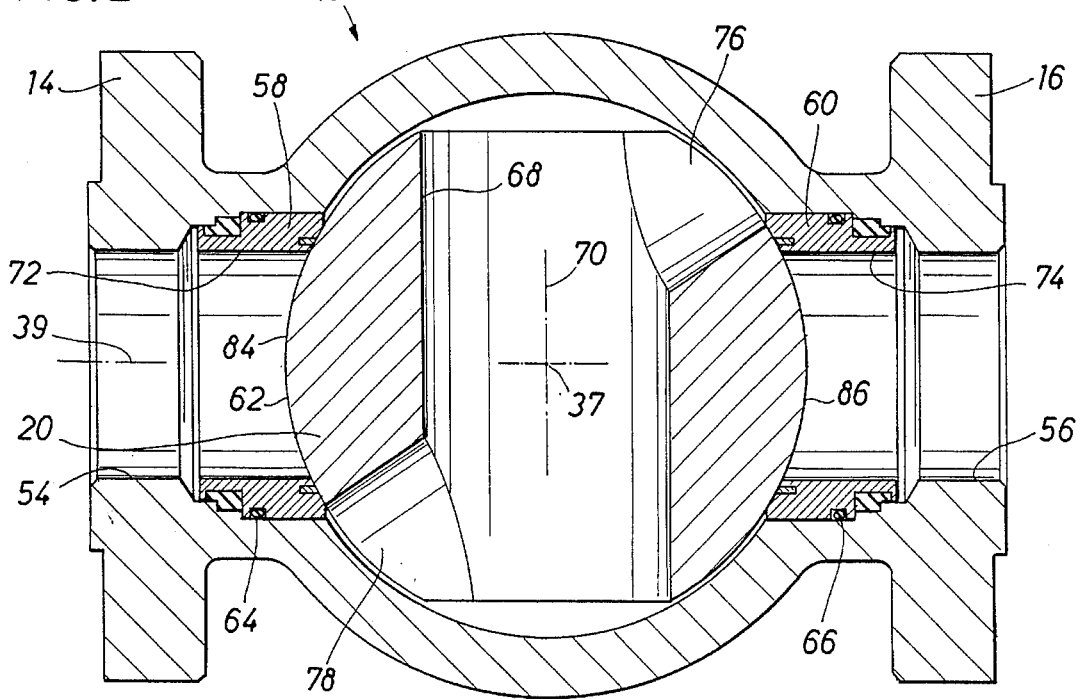

FIG. 2 is a sectional view taken along line 2—2 of FIG. 1.

Figure 3:
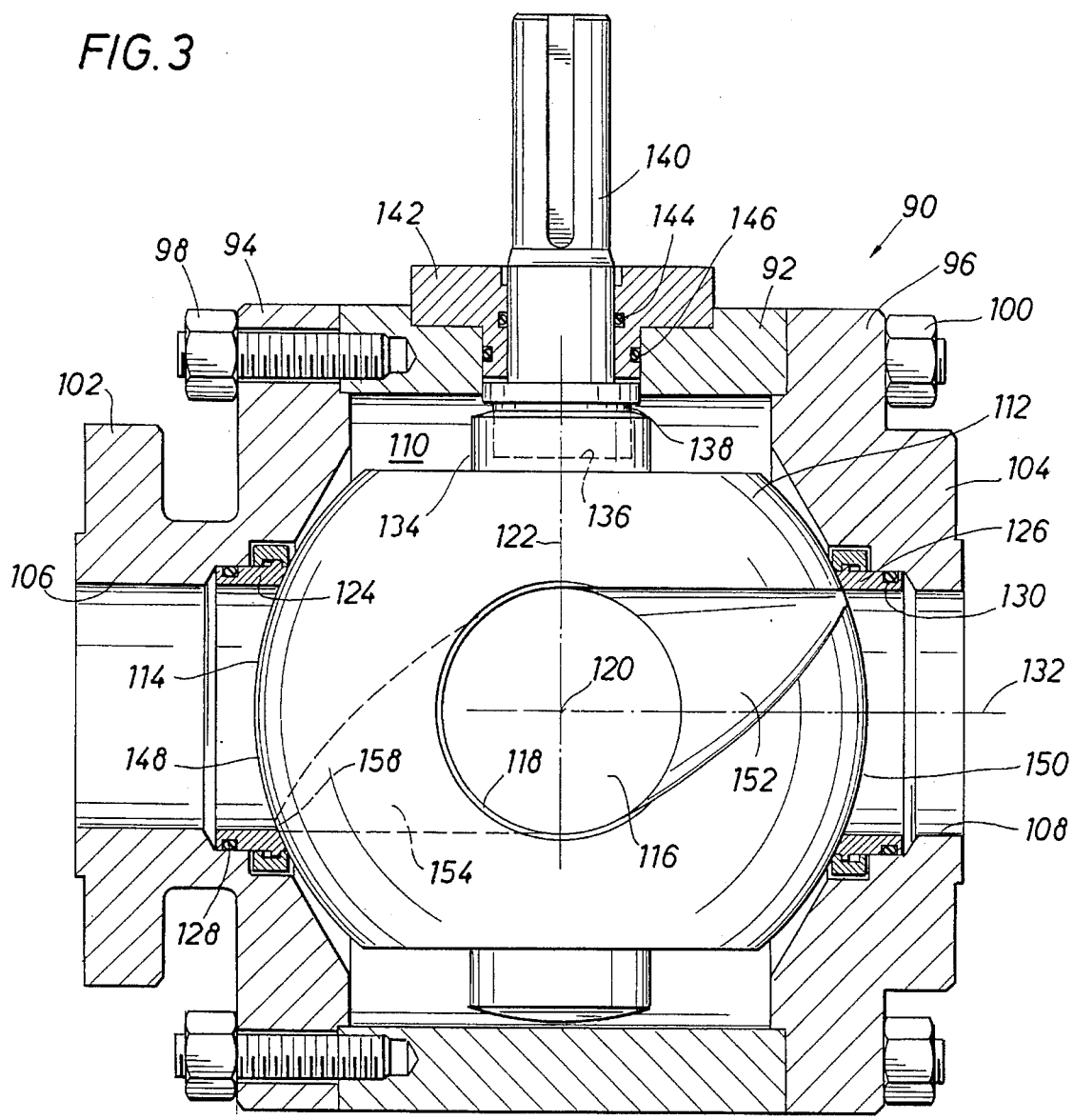

FIG. 3 is a sectional view of an alternative embodiment of the present invention in the form of a spherical rotary flow control valve that is constructed in accordance with the present invention.

Figure 4:
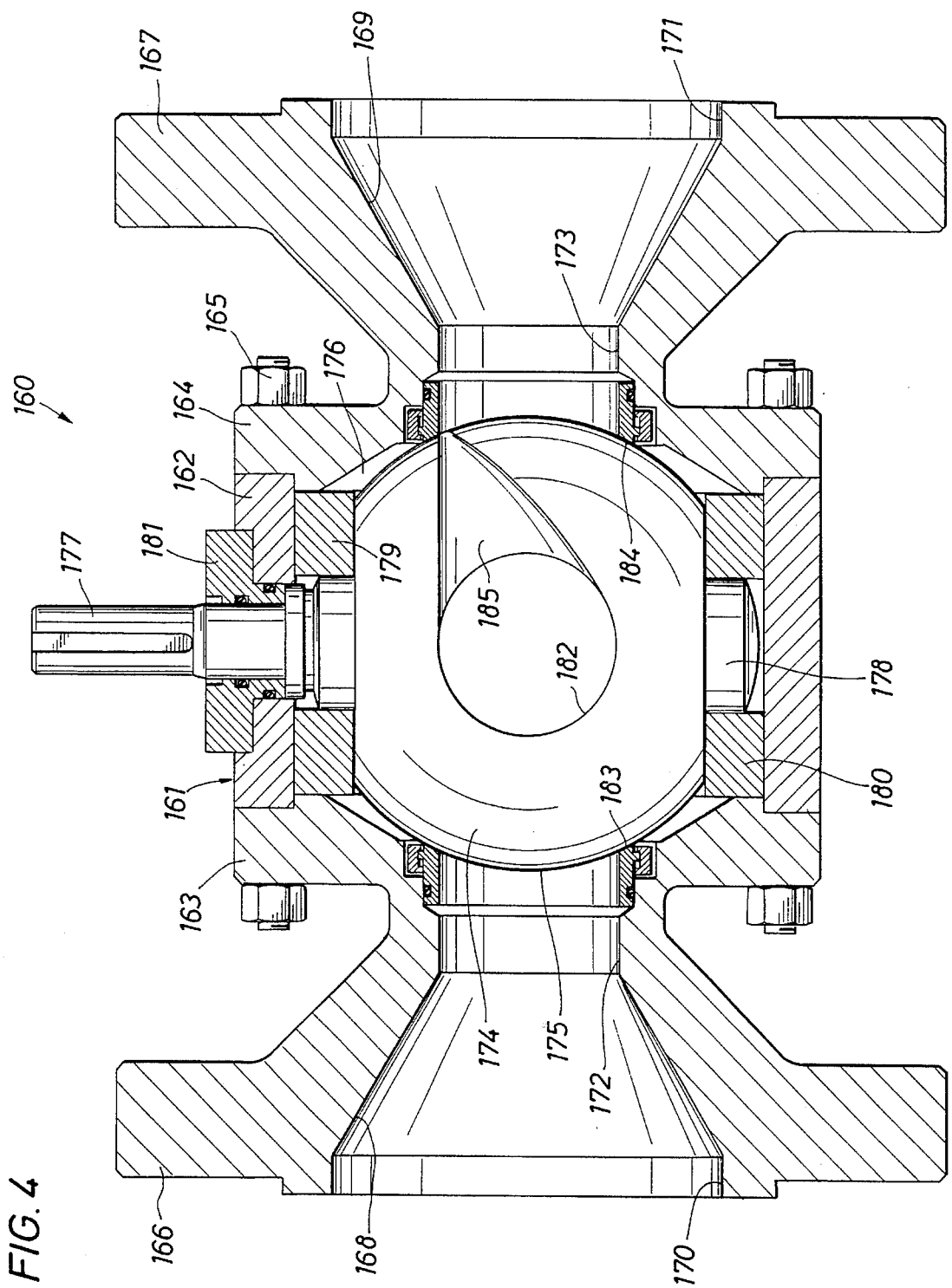

FIG. 4 is a sectional view illustrating a spherical plug type flow control valve representing an alternative embodiment of the present invention wherein a valve ball is provided having a flowway that is of smaller dimension than the internal dimension of the connection flanges of the valve body.

FIG. 5 is a schematic circumferential layout depicting the rotatable valve plug of the flow control valve mechanism of FIGS. 1–4 and showing the flow control slots in relation to the flowway of the rotary valve element.

FIG. 6 is a schematic circumferential layout illustrating flow control slots of the rotatable valve element of this invention, with the small extremities of the throttling slots being oppositely located with respect to the central axis of the flowway.

FIG. 7 is a schematic circumferential layout illustrating throttling slots of the rotatable flow control, valve of this invention, with the small extremities of the flow control slots being located centrally with respect to the central axis of the flowway.

FIG. 8 is a schematic circumferential layout illustrating an alternative embodiment of this invention depicting a rotatable plug valve element having multiple flow control slots which collectively establish efficient control of the flowing fluid.

FIG. 9 is a schematic circumferential layout illustrating an alternative embodiment of this invention depicting a rotatable valve element having multiple flow control passages defined by holes that are drilled or otherwise formed.

FIG. 10 is a schematic circumferential layout illustrating an alternative embodiment of this invention depicting a rotatable valve element having dual flow control ports.

FIG. 11 is a schematic circumferential layout illustrating an alternative embodiment of this invention depicting a rotatable plug valve element having contoured flow control slots.

FIG. 12 is a schematic circumferential layout illustrating an alternative embodiment of this invention depicting a rotatable valve element having contoured flow control slots and showing noise abatement and anti-cavitation trim being located in the contoured slots.

FIG. 13 is a schematic circumferential layout illustrating an alternative embodiment of this invention depicting a rotatable valve element having contoured flow control slots and showing noise abatement and anti-cavitation trim being located in the contoured slots and in the flowway.

Figure 14:
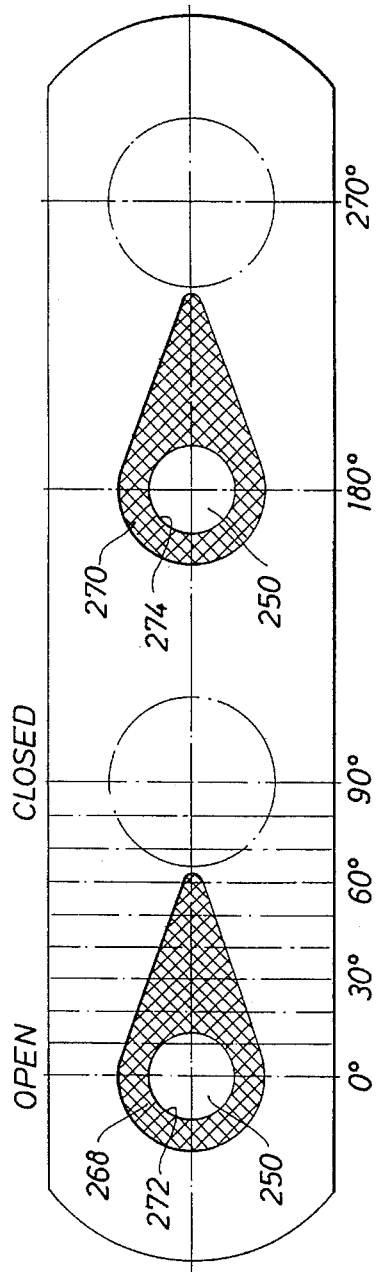

FIG. 14 is a schematic circumferential layout illustrating an alternative embodiment of this invention depicting a rotatable valve element having contoured flow control slots and showing noise abatement and anti-cavitation trim being located in the contoured slots and in a portion of the flowway.

Figure 15:
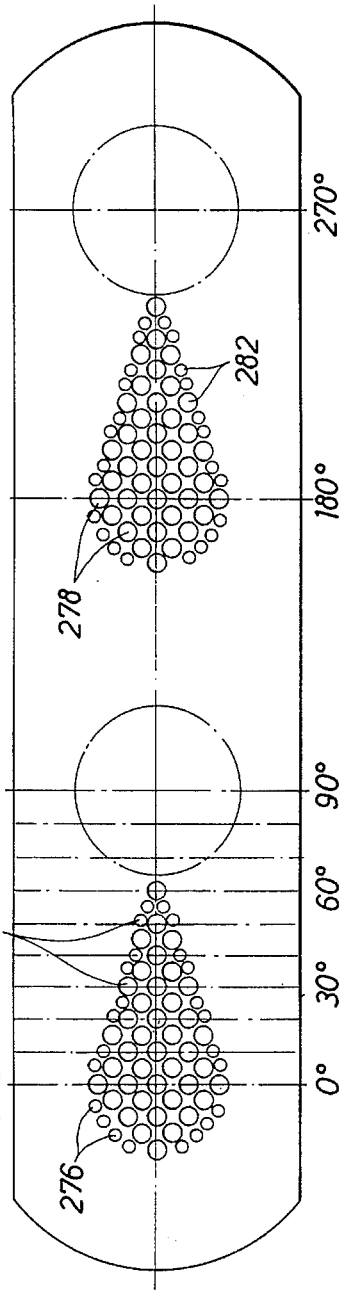

FIG. 15 is a schematic circumferential layout illustrating an alternative embodiment of this invention depicting a rotatable element having flow control passages formed in the rotatable valve element and defining both the flow control passages and the flowway thereof.

Figure 16:
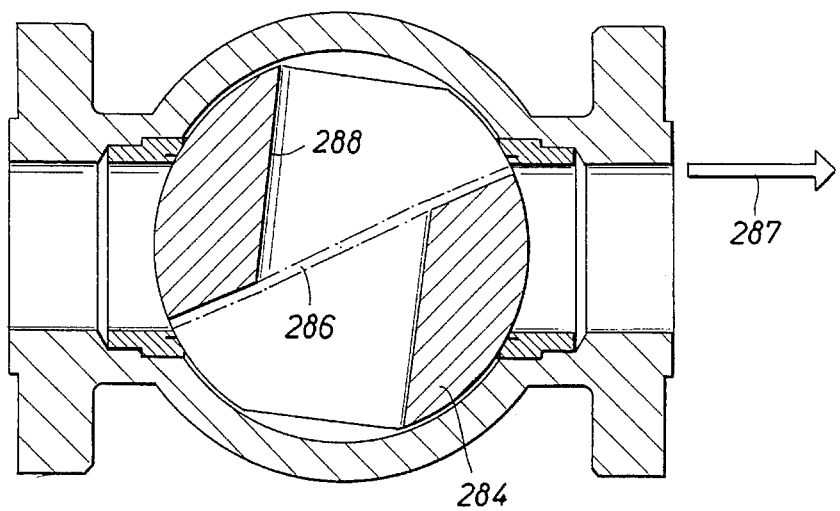

FIG. 16 is a pictorial sectional view of a rotary control valve constructed in accordance with this invention and showing the rotary valve element in its nearly closed flow controlling position and illustrating the magnitude of flow by the width of a flow arrow.

Figure 17:
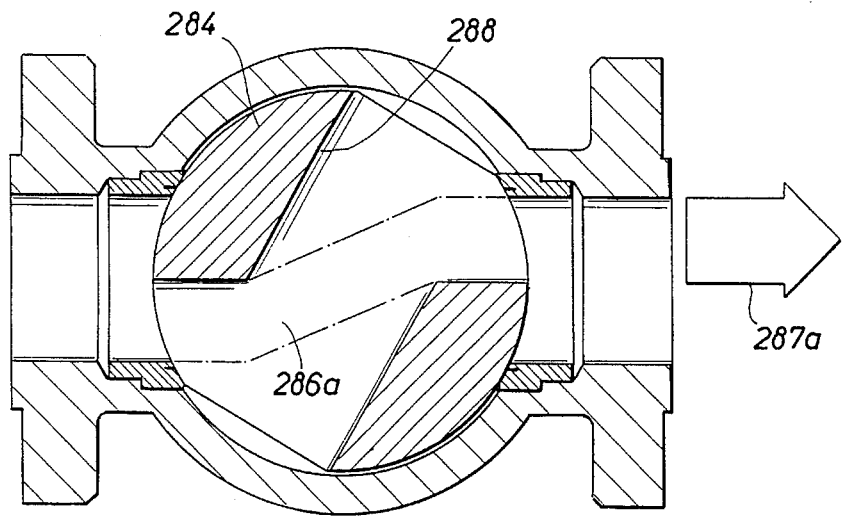

FIG. 17 is a pictorial sectional view similar to that of FIG. 16 and showing the rotary valve element in a more open flow controlling position as compared to FIG. 16.

Figure 18:
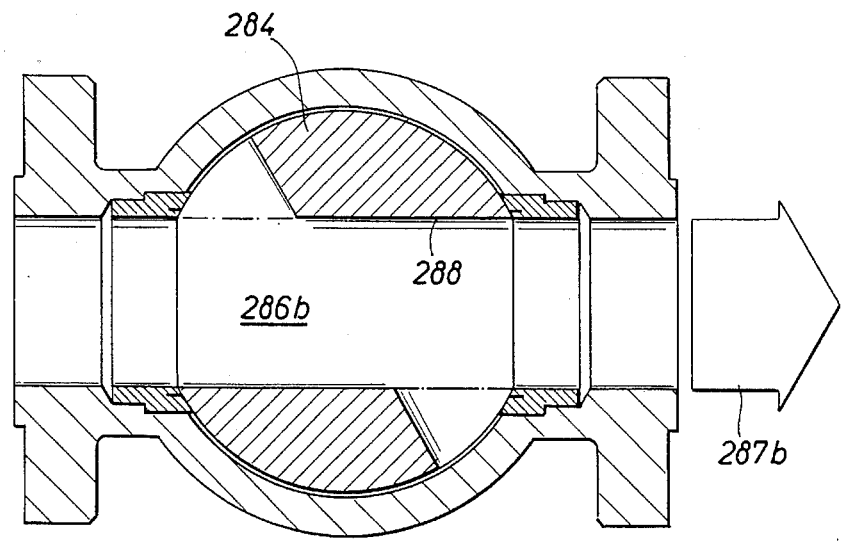

FIG. 18 is a pictorial sectional view similar to that of FIGS. 15 and 16 and showing the rotary valve element in its fully open position.

Figure 19:
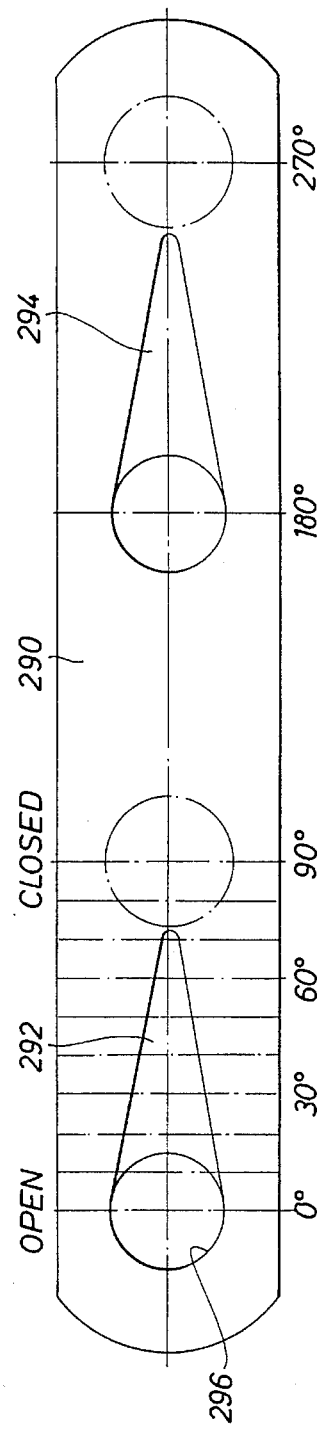

FIG. 19 is a schematic circumferential layout view showing the ratio of flowway diameter to the rotary valve element diameter of 4.0 to 1.0.

Figure 20:
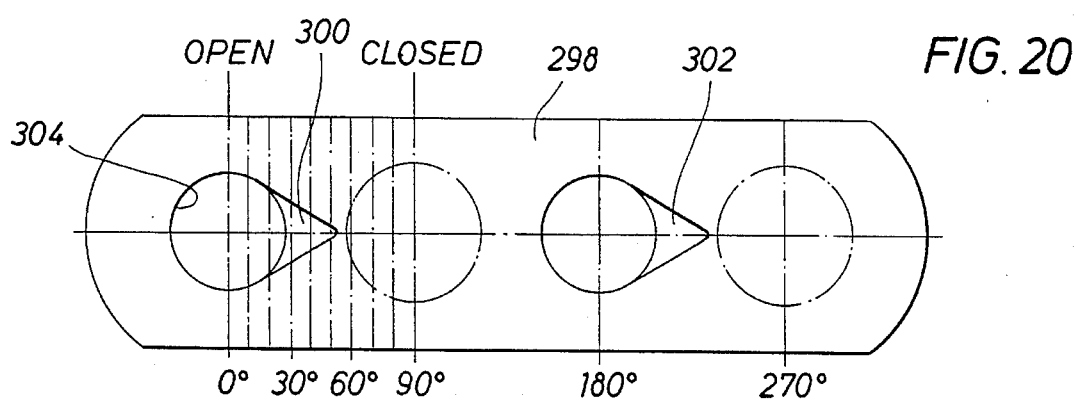

FIG. 20 is a schematic circumferential layout view similar to that of FIG. 19 but showing a ratio of flowway diameter to the diameter of the rotary valve element of 2.0 to 1.0.

DETAILED DESCRIPTION OF PREFERRED EMBODIMENT

Referring now to the drawings and first to FIGS. 1 and 2 a rotary flow control valve constructed in accordance with the present invention is illustrated generally at 10 and incorporates a valve body shown generally at 12 having connection flanges 14 and 16 that permit the valve mechanism to be connected into a flow line, not shown. The valve body 12 defines an internal valve chamber 18 within which is located a rotary plug or ball type valve element 20. The valve element is provided with a trunnion 22 which is received by a trunnion bushing 24 located within an internal trunnion bore 26. At its upper portion the valve element 20 defines a valve stem 28 having a lower section 30 which is received by an upper bushing member 32 of a bushing receptacle 34 that is defined by a valve bonnet or closure member 36. The trunnion 22 and the valve stem 28 are coaxial and define an axis of rotation 37 that intersects the longitudinal axis 39 of the valve body flow passage which is defined by the axially aligned inlet and outlet openings 54 and 56.

The valve bonnet is typically secured to the valve body 12 by means of a plurality of bolts 38 or by any other suitable means of retention. The valve bonnet is sealed with respect to the valve body 12 by means of one or more circular sealing elements 40. A stem packing retainer 42 is secured to the bonnet structure 36 about the valve stem 28 and functions to secure a packing member 44 within a packing chamber 46 thereof. With bonnet structure 36 removed from the valve body there is defined a bonnet opening 48 of sufficient dimension to permit upward extraction of the valve element 20 from the valve chamber 18. Thus, should the valve element or the valve seats become worn and need replacement or repair the bonnet or closure 36 may simply be removed from the valve body to permit the internal movable components to be efficiently removed and replaced while the valve body 12 remains in the flow line.

The valve body 12 is provided internally with a pair of opposed internal seat recesses 50 and 52 which are defined concentrically about inlet and outlet flow passages 54 and 56 and which receive seat assemblies 58 and 60 that establish sealing engagement with the outer sealing surface 62 of the rotary valve element 20. Sealing between the seat assemblies and the valve body is accomplished by circular sealing elements 64 and 66 which are retained within appropriate circular seal grooves of the seat assemblies.

The rotary valve element 20 defines a flowway 68 which is in the form of a through bore defined about a longitudinal axis 70. The flowway 68 is of substantially the same internal dimension as the internal passage sections 72 and 74 of the seat assemblies 58 and 60 and the internal dimension of the inlet and outlet passage sections 54 and 56. Thus, when the rotary valve element 20 is oriented with the flowway 68 in aligned registry with the inlet and outlet passages, a through passage like the trim package 151 of FIG. 5 is collectively defined through the valve mechanism which permits unobstructed flow of fluid therethrough. This straight through flow passage may be of reduced dimension along its length to provide for controlled flow of fluid or to provide for the development of a desired pressure differential across the valve. Alternatively, the flowway of the valve element may be of equal dimension or the dimension of the flow passage defined by the valve body to ensure minimal pressure drop across the valve and, if desired, to permit objects such as line scrapers, pigs, cleaning balls, etc. to be passed through the valve mechanism under the influence of the flowing fluid.

In order to provide the valve mechanism with a flow controlling capability the rotary valve plug element 20 is formed to define a pair of generally "V" shaped contoured throttling slots 76 and 78 which intersect the flowway 68 and which intersect a portion of the external annular sealing surface of the rotary valve element. As shown in FIG. 1 the throttling slots are at the greatest dimension thereof at their respective juncture with the flowway 68 and they gradually reduce in width and depth to the smallest dimensions thereof shown at 80 and 82.

In the V-shaped contoured flow control slots define bottom surfaces or lines 81 and 83 which are coextensive as shown or are oriented in parallel relation. Thus, when the valve element has been rotatable positioned at its smallest flow controlling opening a straight through flow path is established through the rotary valve element as is depicted in greater detail in FIGS. 16–18. Further, due to the full bore dimension of the flowway 68 and the flow control slots 76 and 78, when the valve element is positioned only; slightly open, as shown in FIG. 16, a double pressure drop will be developed, one at the inlet of the valve element and one at its outlet. The flow control slots 76 and 78 will typically be provided with noise abatement and anti-cavitation trim as is evident from FIGS. 12–15 to define torturous flow paths which minimize noise, cavitation and vibration that might otherwise be induced by the flowing fluid.

In the closed position of the valve element 20, as shown in FIGS. 1 and 2, opposed fluid blocking areas 84 and 86 of the valve element, being circumscribed by sealing contact with the respective seat assemblies 58 and 60, function to block the flow of fluid through the valve. In this position the flowway 68 is disposed with its longitudinal axis 70 disposed in substantially normal relation with the longitudinal axis 39 about which the inlet and outlet passages and 54 and 56 are defined. Upon rotation of the valve element 20 about the axis of rotation 37, defined collectively by the valve stem 30 and trunnion 22, the respective flow control slots 76 and 78 will move into fluid communication with the flow passage of the valve, thus permitting fluid under pressure to be transmitted from the inlet flow passage 54 or 56 as the case may be through the upstream flow control slot, into the flowway of the valve element and thence through the downstream flow control slot to the downstream flow passage of the valve. The volume of fluid flow at a particular pressure is determined by the position of the respective flow control slots 76 and 78 with respect to the valve seat assemblies 58 and 60 which establish an effective flow port of a selected dimension. In the event fluid flow under high pressure causes cavitation and noise to an excessive extent the flow control slots 76 and 78 may contain anti-cavitation and noise abatement trim such as shown at 151 in FIG. 5, thus defining tortious flow paths through the flow control slots which will minimize cavitation and noise as is evident from FIGS. 12–15 the noise abatement and anti-cavitation trim may be located within the flowway of the rotary valve element as well.

It can be seen from FIGS. 1 and 2 that movement of the rotary valve plug element 20 from the fully closed position shown in FIGS. 1 and 2 to the fully open position is accomplished by rotary valve movement of about 90°. This 90° rotational movement permits the use of conventional 90° rotary valve actuators and thus permits a flow control valve mechanism of this nature to be provided to customers at relatively low cost. If desired, this rotary plug movement can be in the range of from about 60° to about 130°. Preferably, valve plug rotation in the range of about 90° is considered desirable for the reason that 90° valve actuators are readily available at nominal cost.

Referring now to FIG. 3 an alternative embodiment of the present invention is shown which includes a valve body structure shown generally at 90 having an annular housing member 92 to which is connected body flanges 94 and 96 by means of bolts or threaded studs 98 and 100. The end members 94 and 96 may be provided with connection flanges such as shown at 102 for bolted connection to a pipe flange, not shown or in the alternative, may be provided with a bolted or welded type flange structure 104 as suits the needs of the user. The connection flanges 102 and 104, as the case may be, define inlet and outlet flow passages 106 and 108 to permit the transition of fluid through the valve mechanism. The central body section 92 and the end members 94 and 96 of the body structure cooperatively define an internal valve chamber 110 within which is received a rotary generally spherical plug or ball type flow control valve element 112. The rotary valve element defines an outer spherical sealing surface 114 which is intersected by a flowway 116 having a generally cylindrical wall 118 defined about a longitudinal axis 120. The spherical valve member 112 is supported about an axis of rotation 122 by engagement with seat assemblies 124 and 126 which are respectively received within circular seat recesses 128 and 130 that are defined concentrically about a longitudinal axis 132 about which the flow passages 106 and 108 are also concentrically oriented. The spherical valve element is further provided with an upstanding boss 134 definitely an internal stem drive receptacle 136 receiving the stem drive element 138 of a valve stem 140 to provide for a rotation of the valve element upon consequent rotation of the valve stem. The valve stem is sealed with respect to the valve body by means of a packing gland 142 having internal and external seals 144 and 146 respectively.

The valve mechanism of FIG. 3 is shown in its closed position with the flowway 116 oriented at substantially 90° out of aligned registry with the inlet and outlet flow passages 106 and 108. In this position opposed blocking areas 148 and 150 of the spherical sealing surface 114 are bound or circumscribed by sealing engagement with the respective circular seat assemblies 124 and 126 thereby preventing flow of fluid through the valve mechanism.

For the purpose of flow control a pair of contoured flow control slots 152 and 154 are defined in the rotary valve member and extend from respective ends of the flowway 116 and circumferentially along the spherical sealing surface 114 to a location just outside the boundary of sealing engagement with the blocking surface 150. With only slight rotary movement of the valve element 112 from its closed position toward its open position the small ends of the contoured flow control slots will move past the seat assemblies and into fluid communication with the respective inlet and outlet flow passages. Even in this partially open position a straight through flow path is defined through the valve mechanism. These flow control slots vary in width and depth from the respective small ends 156 and 158 thereof to the largest dimension at the points of intersection with the flowway 116. Thus as the valve element 112 is rotated more toward its open position the effective orifice dimension of the flow control slots increase according to the angular position of the valve element 112. These flow control slots may also be provided with anti-cavitation and noise abatement trim as is mentioned above to minimize cavitation and noise as the result of high pressure fluid flow control.

Referring now to FIG. 4 there is shown a sectional view of a rotary spherical flow control valve shown generally at 160 having a valve body shown generally at 161 and incorporating a central body section 162 to which is bolted end members 163 and 164 by a plurality of stud and nut assemblies 165. The end members of the valve body define connection flanges 166 and 167 for bolted connection to pipe flanges of a flowline and define internal tapered sections 168 and 169 which form reducing flow passage sections typically having the same internal dimension at the inlet and outlet ends 170 and 171 as the internal dimension of the flowline into which the valve mechanism is connected. These reducing sections define reduced diameter flow ports 172 and 173 which have a diameter that is of significantly smaller dimension as compared to the dimension of the inlet and outlet ports 170 and 171.

A rotatable valve member 174 having an outer spherical sealing surface 175 is supported for rotation within a valve chamber 176 of the valve by an upper valve stem 177 and a lower trunnion 178 of the rotary valve member. The valve stem and trunnion are supported for rotation by bearing or bushing members 179 and 180. The valve stem extends externally of the valve chamber and is sealed relative to the central body section 162 by a packing gland 181. The rotary valve member also defines a straight through flowway 182 of a dimension substantially corresponding to the dimension of the restricted flow ports 172 and 173. The rotary valve member is sealed with respect to the valve body structure by means of a pair of seat assemblies 183 and 184 which are respectively retained within internal seat recesses defined within the respective end members.

For the purpose of flow control activity the rotary valve member 174 defines a pair of contoured flow control slots 185 which intersect the flowway 182 near opposite ends thereof. These contoured flow control slots are of the configuration shown in FIG. 5 and for purposes of noise and cavitation control may include noise abatement and anti-cavitation trim such as is described above and as further shown in connection with the layout illustrations of FIGS. 13–15.

The angular relation of rotational valve movement relative to the open and closed positions of the throttling valve mechanism of FIG. 4 is shown diagrammatically in the layout illustration of FIG. 5. The closed position is shown at 0° rotation in FIG. 5. It should be noted that the small dimension 156 of the contoured throttling slot 152 at this point is located very close to the circular boundary 125 which is defined by sealing engagement of the seat assembly with the sealing surface of the rotary valve element so that the blocking area 150 of the valve element is out of communication of the flow control slot. As the flow control slot 152 is moved toward the seal sealing boundary 125 upon slight rotational movement of the valve element the small dimension 156 of the flow control slot will cross the seal boundary 125 thereby permitting fluid communication between the flow passage and the flow control slot. This communication however is restricted by virtue of the very small dimension of the flow control slot at or near the extremity 156. As the flow control slot moves further in relation to the seal boundary 125 until it reaches its full open position at 90°. It is evident that the effective dimension of the flow control slot will increase in relation to valve ball position until the full open condition of the valve element has been established. At the left hand portion of FIG. 5 it is seen that anti-cavitation and noise abatement trim 151 is located in the flow control slot and serves to develop a torturous flow path through which fluid may flow as it traverses the flow control slots to and from the flow passages of the valve body and the flowway of the valve element. In the event the cavitation and noise abatement trim should become clogged with accumulation of solids the rotary position of the valve element can simply be reversed to permit fluid flushing of the accumulated solids from the torturous flow paths of the trim package. The trim of the upstream and downstream flow control slots can differ if desired so that complete flow control can occur upon traverse of fluid completely through the flow control slots and the valve ball flowway. In the event the trim package is different at each extremity of the rotary flow control ball valve element the valve mechanism can be of unidirectional character. The inlet and outlet flow control slots may also be of differing dimension if desired.

Referring now to FIGS. 6–15 a number of different rotary plug type flow control valve layouts are depicted which illustrate differing contoured flow control slot or passage configuration. In each case the flow control slots or passages are provided to define controlled flow of fluid through the valve mechanism at different rotational positions thereof and noise abatement and anti-cavitation trim is provided to assist in flow control.

As shown in FIG. 6 the rotatable valve element depicted in the layout illustration defines opposed contoured flow control or throttling slots 186 and 187 that taper in both width and depth along the length thereof from a large slot dimension at the intersection of the throttling slot with the respective end of the flowway as shown at 190 and 191 to a small dimension as shown at 192 and 193. At the lower portion of the Figure various angular rotary valve element positions are shown, illustrating rotational movement of the valve element from 0° to 90° at the left hand portion of the Figure and further illustrating the opposite end of the flowway 191 being located at 180°. The external annular sealing surface 194 of the valve plug defines blocking surface areas 195 and 196 located at 90° and 270° respectively. It should be noted with respect to FIG. 6 that the tapered flow control slots 187 and 188 are oppositely oriented with respect to the longitudinal axis 197. Such opposite orientation of the contoured flow control slots or passages provides the rotary valve member with exceptional strength. Further, such opposite orientation of the flow control slots or passages permits the flow control slots to be of slightly greater length as compared to the flow control slots of FIG. 7.

FIG. 7 is a valve plug layout illustration similar to that of FIG. 5 and showing throttling slots or passages 198 and 199 that are oriented in alignment with the horizontal axis 200 thereof.

As shown in FIG. 8 a valve plug layout is shown depicting an annular plug sealing surface 201 having flowway extremities 202 and 203. Flow control passage or slot means 204 and 205 are defined by multiple, generally parallel external slots or passages which establish flow control communication with the flowway of the valve element. The external annular sealing surface 201 of the rotary valve element may be of spherical, tapered or straight configuration as desired and includes blocking surface areas 206 and 207 illustrating seal location at the closed position of the valve.

The valve element layout illustration of FIG. 9 shows a rotary valve element having an external sealing surface 208 which is intersected by the flowway at 209 and 210. Throttling or flow control is achieved by a plurality of flow control ports or passages 211 and 212 respectively which may be in the form of holes that are drilled or otherwise formed in the rotary valve element. Blocking surface areas 213 and 214 of the external sealing surface 208 are encompassed by the valve seats of the valve; mechanism at the fully closed position of the valve element.

As shown in FIG. 10, the valve element layout illustration defines an annular sealing surface 215 which is intersected at 216 and 218 by the flowway of the valve element. Flow control or throttling passages 220 and 222 are shown which are positioned in registry with the flow passages of the valve to provide for precise control of fluid flow. When the valve flowway is in registry with the flow passages of the valve body flow through the flow control valve mechanism is unobstructed so that the pressure drop across is virtually the same as the pressure drop across an open full ported ball valve. If the flowway is of the same or greater dimension as compared with the dimension of the flow passage of the valve body line cleaning devices may be passed through the throttling valve in its fully open condition. When the flow control passages of the rotary valve element are in registry with the flow passage of the valve body a restricted flow is permitted which is determined by the dimension of the flow control passages 220 and 222. The sealing surface 214 defines blocking areas 224 and 226 which are encompassed by the seat assemblies of the valve in its fully closed condition of the valve.

As shown in FIG. 11 the valve element layout depicts an annular sealing surface 228 which is intersected at 230 and 232 by the flowway of the valve element. Throttling or flow control is accomplished by contoured flow control slots or passages 234 and 236 which are shown oriented in alignment with the longitudinal axis 238 of the flowway. It should be borne in mind that these contoured external slots or throttling passages may be oriented in misaligned relation with the longitudinal axis in the same manner as shown above in FIG. 6. The sealing surface 228 also defines blocking areas 240 and 242 which are oriented 180° apart and which are encompassed by the seat assemblies of the valve in the fully closed position of the valve element.

The noise abatement and anti-cavitation trim for the rotary flow control valve mechanism of this invention may be located solely in the contoured flow controlling slots or it may be located both in the flow controlling slots and in the flowway of the rotary valve element or in a portion of the flowway. These features are evident from the schematic layout illustrations of FIGS. 12–15.

As shown in FIG. 12 the layout illustration identifies an annular sealing surface 244 which is intersected by the ends 246 and 248 of a flowway 250. The sealing surface of the rotary valve element defines blocking areas 252 and 254 which are circumscribed by sealing contact with the seat assemblies in the closed position of the rotary valve element. For purposes of flow control the rotary valve element is provided with a pair of contoured flow control slots 256 and 258 having noise abatement and anti-cavitation trim 260 and 262 located respectively therein and defining a trim package. The flow control ports or slots 76 and 78 of the flow control valve of FIGS. 1 and 2, the flow control slots 152 and 154 of the flow control valve of FIG. 3 and the flow control slots 158 of the flow control valve of FIG. 4 will each be provided with an anti-cavitation trim package for flow control as well as noise control. The trim package may be defined by a plurality of layers of perforate trim material, with the layers being of differing dimension and cooperatively oriented so as to establish a torturous flow path which causes a pressure drop between trim layers. Thus, there is developed pressure drop across the trim as the flowing fluid passes into or from the respective trim packages. This "double" pressure drop has been found quite effective in both the reduction of noise and cavitation. The trim packages may be defined by individual layers of trim material which are welded or otherwise fixed in place or, in the alternative, the trim package may be a unitary structure which is retained in assembly with the rotary valve element in any suitable manner.

As shown in FIG. 13 the rotary valve element structure is identical to that of FIG. 12, with the exception that the noise abatement and anti-cavitation package shown at 264 and 266 is located not only in the contoured flow control slots but also in the flow ports 250 and 251. The purpose of the trim package as shown in FIG. 13 is essentially the same as described above in connection with FIG. 12, the exception being that the flowway 250 in the case of FIG. 13 is partially closed by the trim. In this case it is not possible to pass any object through the flowway.

As shown in FIG. 14, the rotary valve element structure is essentially the same as described above in connection with FIGS. 12 and 13, with the exception that alternative noise abatement and anti-cavitation trim packages 268 and 270 are provided which fill at least a substantial portion of the contoured flow control slots and also fill a portion of the flowway 250. Thus, the trim packages and 268 and 270 leave a central unobstructed opening as shown at 272 and 274 through which fluid may flow in unobstructed manner.

As shown in FIG. 15 the rotary valve element construction is essentially the same as shown in FIGS. 12-15 in this case however the flowway is defined in part by a plurality of passages shown at 276 and 278. Likewise, similar drilled or otherwise formed passages 280 and 282 are provided to define the flow controlling passage means of the rotary vane element and also to minimize noise and cavitation.

Referring now to FIGS. 16-18 the design of the tapered or V-shaped contoured flow control slots permit full opening and complete shutoff of the flow control valve mechanism in rotary vane movement of about 90°. Further the vane mechanism defines a path that extends straight through the rotary valve element at any position thereof. In FIG. 16 the rotary valve element 284 is shown in position to define a restricted straight through path 286 which intersects the flowway 288. The magnitude of fluid flow is thus depicted by the width of the flow arrow 287. In FIG. 17 the rotary valve element is shown rotated to a more open position as compared with FIG. 16 and thus defines a straight through path 286a of increased dimension as compared to FIG. 16. The magnitude of fluid flow through the valve is in this case defined by the broader width of the flow arrow 287a. When fully open as shown in FIG. 18 the flowway 288 is in registry with the inlet and outlet passages of the valve body so that full flow occurs as indicated by the width of the flow arrow 287b. In this full open position the pressure drop across the valve mechanism is nearly the same as in a length of equal diameter pipe and full unobstructed and uncontrolled flow is permitted through the control valve.

The length of the contoured flow control slots in relation to the flowway diameter can be efficiently selected to provide the rangeability that is desired by the user. When this is done, the diameter of the rotary valve element will be established by the ratio of contoured flow control slot length to flowway diameter. As the ratio increases, the length of the flow control slots will also increase. For example, a rotary valve element having a 6" diameter flowway with a 2.0 to 1.0 ratio of flow control slot length to flowway diameter would result in a rotary valve element diameter of 24". As the ratio increases the length of the contoured flow control slots becomes greater, giving greater flow control rangeability for the same amount of rotation of the rotary valve element. As shown in FIG. 19 the circumferential length of the valve element 290 is depicted in the schematic layout illustration. At a slot length with a ratio of 4.0 to 1.0 the length of the contoured flow control slots 292 and 294 is depicted as graphically illustrated in relation to the diameter of the flowway 296. The resulting circumference of the rotary valve element is depicted by the overall length of the schematic layout of FIG. 19.

The schematic layout of a rotary valve element having a slot length with a 2.0 to 1.0 ratio is shown in FIG. 20. In this case the valve element 298 defines contoured flow control slots 300 and 302 that are much shorter as compared with flow control slots 292 and 294 of FIG. 19 even though the flowway 304 is of the same dimension. Consequently, the valve element of FIG. 20 will be of smaller diameter as indicated by the overall length of the circumferential layout. Thus the flowway diameter and the selected length of the contoured flow control slots will determine the diameter of the rotary valve element. The user can thus choose for any given flowway diameter the flow control rangeability that is desired and weight these factors in light of the resulting valve size. If a maximum valve size is necessary the rangeability for that valve size can be efficiently established.

It is thus seen that the present invention is one well adapted to attain all of the objects and features hereinabove set forth together with other objects and features which become obvious upon an understanding of the invention itself. Other combinations and subcombinations may be provided according to the teaching of the invention without departing from the spirit and scope of the present invention. The embodiments disclosed herein are intended as illustrative and should not be considered to limit the scope of this invention in any manner whatever.

What is claimed is:

1. A rotatable flow control valve, comprising:

(a) a valve body defining a valve, chamber and inlet and outlet flow passages in communication with said valve chamber and having a common longitudinal axis;

(b) valve seat means being located within said valve chamber and establishing sealing with said valve body about respective inlet and outlet passages;

(c) a rotary valve element being positioned for rotation within said valve chamber about an axis of rotation disposed in substantially normal relation with said common longitudinal axis and having an annular external sealing surface disposed in sealing engagement with said valve seat means, said rotary valve plug further defining a substantially straight flowway therethrough being positionable in the fully open position of said rotary valve element in substantially coextensive straight through relation with said inlet and outlet passages, said rotary valve element also defining at least one contoured flow control passage having a varying dimension along the length and depth thereof, said rotary valve element also defining opposed blocking surface areas being opposed portions of said annular external sealing surface and being offset substantially 90° from said flowway and being offset substantially 180° apart; and (d) anti-cavitation and noise abatement means being located within said at least one flow control passage and defining a torturous path through which fluid must flow.

2. The rotatable flow control valve of claim 1, wherein:
(a) said rotatable valve element defines a pair of flow control passages; and
(b) said anti-cavitation and noise abatement means of respective flow control passages being substantially identical.

3. The rotatable flow control valve of claim 2, wherein:
said pair of flow control passages are of substantially the same dimension.

4. The rotatable flow control valve of claim 2, wherein:
each of said flow control passages is of varying width and depth along the length thereof having its largest dimension at the intersection thereof with said flowway.

5. A rotary flow control valve, comprising:
(a) a valve body defining a valve chamber and inlet and outlet flow passages in communication with said valve chamber and having a common longitudinal axis;
(b) valve seat means being located within said valve chamber and establishing sealing with said valve body about respective inlet and outlet passages;
(c) a rotary flow controlling valve element being positioned for rotation within said valve chamber about an axis of rotation disposed in substantially normal relation with said common longitudinal axis and having a spherical external sealing surface disposed in sealing engagement with said valve seat means, said rotary valve element further defining a substantially straight flowway having a longitudinal axis and being positionable in the fully open position of said rotary valve element in substantially coextensive straight through relation with said inlet and outlet passages and with said longitudinal axis of said flowway in substantially coextensive relation with said longitudinal axis of said inlet and outlet passages, said rotary flow controlling valve element also defining a pair of elongate contoured flow control slots each varying in width and depth along the length thereof and intersecting said spherical external sealing surface and being disposed in communication with said flowway, said pair of contoured flow control slots defining the largest cross-sectional dimension at the intersection thereof with said flowway, said rotary flow controlling valve element also defining blocking surface areas being opposed portions of said external annular sealing surface and being located substantially 180° apart and being offset substantially 90° from said flowway;
(d) wherein said rotary valve element defines a ratio of flowway diameter to rotary valve element diameter in the range of from 1.0 to 2.0 to 1.0 to 4.0; and
(e) substantially equal anti-cavitation and noise abatement means being located within said each of said flow control slots and defining a torturous path in each of said flow control slots through which fluid must flow.

* * * * *